United States Patent [19]
Berberich et al.

[11] Patent Number: 5,760,998
[45] Date of Patent: Jun. 2, 1998

[54] DISK DRIVE WITH ROTATABLE BUMPER BLOCKS

[75] Inventors: James William Berberich, San Jose, Calif.; Lowell James Berg; Zine-Eddine Boutaghou, both of Rochester, Minn.; John S. Heath, Winchester, England; Jerry Lee Neubauer, Stewartville, Minn.

[73] Assignee: International Business Machines Corporation, Armonk, N.Y.

[21] Appl. No.: 898,190

[22] Filed: Jul. 22, 1997

Related U.S. Application Data

[62] Division of Ser. No. 749,480, Nov. 13, 1996, Pat. No. 5,703,734, which is a continuation of Ser. No. 321,935, Oct. 12, 1994, abandoned.

[51] Int. Cl.$^6$ .................................................. G11B 33/08
[52] U.S. Cl. ..................... 360/97.02; 361/685; 369/75.1; 369/263
[58] Field of Search .................. 360/97.02, 97.03, 360/97.01; 369/75.1, 263; 361/685; 220/378; 248/615

[56] References Cited

U.S. PATENT DOCUMENTS

| | | | |
|---|---|---|---|
| 4,150,406 | 4/1979 | Stollorz | 360/97.01 |
| 4,367,503 | 1/1983 | Treseder | 360/97.03 |
| 4,418,369 | 11/1983 | Applequist et al. | 360/97.03 |
| 4,491,888 | 1/1985 | Brown et al. | 360/98.07 |
| 4,831,479 | 5/1989 | Branc et al. | 360/97.02 |
| 5,021,905 | 6/1991 | Sleger | 360/97.02 |
| 5,080,252 | 1/1992 | Haga | 360/132 |
| 5,097,978 | 3/1992 | Eckerd | 360/97.02 |
| 5,149,048 | 9/1992 | Morehouse et al. | 360/97.02 |
| 5,187,621 | 2/1993 | Tacklind | 360/97.02 |
| 5,223,996 | 6/1993 | Read et al. | 360/97.02 |
| 5,233,491 | 8/1993 | Kadonaga et al. | 360/97.02 |
| 5,257,151 | 10/1993 | Cooper et al. | 360/98.07 |
| 5,394,306 | 2/1995 | Koenck et al. | 361/809 |
| 5,463,527 | 10/1995 | Hager et al. | 361/685 |

FOREIGN PATENT DOCUMENTS

| | | | |
|---|---|---|---|
| 56-130867 | 10/1981 | Japan . | |
| 63-204580 | 8/1988 | Japan | 360/97.02 |
| 2-187977 | 7/1990 | Japan . | |
| 3-260980 | 11/1991 | Japan . | |

OTHER PUBLICATIONS

"Safe-Use Sensor for PCMCIA-Type Drives". Boutaghou. IBM Technical Disclosure Bulletin, vol. 38. No. 05, pp. 3–4. May 1995.

*Primary Examiner*—Craig A. Renner
*Attorney, Agent, or Firm*—Richard E. Billion; Matthew J. Bussan

[57] ABSTRACT

A disk drive has at least one disk for storing data and at least one transducer for reading or writing data to or from the disk. The transducer is attached to an actuator which positions the transducer with respect to the disk. The actuator includes a controllable motor which is used to move the actuator and the transducer attached thereto. The disk drive also includes a ramp for off loading the transducer or for parking the transducer off of the surface of the disk. The disk drive includes a combination shock absorber and gasket that has locking tabs to keep the combination shock absorber and gasket in place during a shock or impact loading event. The combination shock absorber and gasket also can be provided with additional extensions to lessen shocks caused by flat drops. Elastomeric blocks or pads can be provided on the cover and the base to lessen shocks caused by flat drops. The drive can also have rotatable elastomeric blocks that can rotate to a position above the disk drive to lessen shocks resulting from flat drops. The drive also is provided with a shock sensor which provides visual evidence that the drive has undergone a shock of a predetermined threshold. Another shock absorbing system uses a shroud around the connector on the disk drive.

3 Claims, 11 Drawing Sheets

DISK DRIVE WITH ROTATABLE BUMPER BLOCKS

This is a divisional of application Ser. No. 08/749,480 filed on Nov. 13, 1996, now U.S. Pat. No. 5,703,734, issued Dec. 30, 1997 which is a continuation of application Ser. No. 08/321,935 filed on Oct. 12, 1994, now abandoned.

FIELD OF THE INVENTION

The present invention pertains to the field of disk drives which are also called direct access storage devices (DASD).

More particularly, this invention pertains to a shock protection apparatus for a disk drive or direct access storage device (DASD).

BACKGROUND OF THE INVENTION

One of the key components of a computer system is a place to store data. Typically computer systems employ a number of storage means to store data for use by a typical computer system. One of the places where a computer can store data is in a disk drive which is also called a direct access storage device.

A disk drive or direct access storage device includes several disks which look similar to 45 rpm records used on a record player or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Compact disks have tracks as do the disks in a disk drive. The tracks in either the disk drive or the compact disk essentially replace the grooves in a 45 rpm record. Each track in a disk drive is further subdivided into a number of sectors which is essentially just one piece of the track.

Disks in a disk drive are made of a variety of materials. Most commonly, each other the disks used in rotating magnetic systems is made of a substrate of metal, ceramic, glass or plastic with a very thin magnetizable layer on either side of the substrate. Such a disk is used in magnetic, and magneto-optical storage. Storage of data on such a disk entails magnetizing portions of the disk in a pattern which represents the data. Other disks, such as those used in CD's, are plastic. Data, such as songs, is stored using a laser to place pits in the media. A laser is used to read the data from the disk.

As mentioned above, to store data on a disk used in a rotating magnetic system, the disk is magnetized. In order to magnetize the surface of a disk, a small ceramic block known as a slider which contains at least one magnetic transducer known as a read/write head is passed over the surface of the disk. Some ceramic blocks contain a separate read head and a separate write head. The separate read head can be a magnetoresistive head which is also known as an MR head. The ceramic block is flown at a height of approximately six millionths of an inch or less from the surface of the disk and is flown over the track as the transducing head is energized to various states causing the track below to be magnetized to represent the data to be stored. Some systems now also use near contact recording where the slider essentially rides on a layer of liquid lubricant which is on the surface of the disk. With near contact recording, the ceramic block passes even closer to the disk.

To retrieve data stored on a magnetic disk, the ceramic block or slider containing the transducing head is passed over the disk. The magnetized portions of the disk generate a signal in the transducer or read head. By looking at output from the transducer or read head, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own slider and transducing head. This arrangement is comparable to having a stereo that could be ready to play both sides of a record at anytime. Each side would have a stylus which played the particular side of the record.

Disk drives also have something that compares to the tone arm of a stereo record player. The tone arm of a disk drive, termed an actuator arm, holds all the sliders and their associated transducing heads, one head for each surface of each disk supported in a structure that looks like a comb at one end. The structure is also commonly called an E block. A portion of metal, known as a suspension, connects the sliders to the E block. At the other end of the actuator is a coil which makes up a portion of an voice coil motor used to move the actuator. The entire assembly is commonly referred to as an actuator assembly.

Like a tone arm, the actuator arms rotate so that the transducers within the sliders, which are attached to the actuator arm can be moved to locations over various tracks on the disk. In this way, the transducing heads can be used to magnetize the surface of the disk in a pattern representing the data at one of several track locations or used to detect the magnetized pattern on one of the tracks of a disk. Actuators such as the ones described above are common to any type of disk drive whether its magnetic, magneto-optical or optical.

Disk drives, like all other electronic devices, are becoming smaller and smaller. These smaller drives are being used in portable laptop computers and notebook computers which are also very small. These smaller drives can be removed from these smaller computers. Some of these smaller drives have the dimensions of a thick plastic credit card and can literally be carried around in a person's shirt pocket. The dimensions of these drives as well as other parameters are set by an industry standard called the Personal Computer Memory Card Industry Association, also known as PCMCIA. Due to the removability and small size, these drives are more susceptible to being dropped. The PCMCIA standard includes a series of drop tests that must be passed.

PCMCIA standard handling specifications require that products (including disk drives) be able to withstand drops of 30 inches onto very hard vinyl clad cement floor surface. This drop converts a significant amount of potential energy into kinetic energy. Accordingly, due to the reduced size of the disk drive, the PCMCIA DASD is more delicate and may be more susceptible to damage upon impact. The abrupt stop upon impact converts the kinetic energy into very high deceleration forces which may exceed the forces which the PCMCIA DASD components may accommodate.

Passing the PCMCIA standard requires either increasing the sturdiness of the internal components, or reducing the deceleration forces during impact to a point below critical acceleration levels for the components of the DASD. Increasing the sturdiness of the internal components in is more or less thwarted by the fact that the size of the devices has been reduced such that maintaining significant strength within some components is no longer possible. The remaining approach is to provide shock protection.

Although there are many possible sources for impacts to a disk drive, there seem to be two sources of impact which are more likely. The use of the disk drives or DASD in laptop and notebook size computers suggests a high probability of DASD impacts as a result of the computer being dropped or mishandled. The impacts also can result from any rough handling of the disk drive itself after it has been removed or before it has been placed into the slot in the computer. One example might be when the disk drive has been removed from the computer and placed in a shirt pocket of the user. When the user bends over to pick something up, the disk drive could fall onto the floor. Another example would be dropping a disk drive out of an executive's brief case or even fumbling a disk drive on a plane when trying to change from one hard disk drive to another disk drive. The impacts that occur to the disk drive when not installed in a computer, as a general rule, will probably be more serious than the impacts that result while the drive is housed within the computer.

Two types of impacts to an uninstalled disk drive seem to be particularly devastating. The first is when the disk drive falls on a corner of the disk drive. The second is known as a flat drop when a disk drive falls squarely on the entire base or cover of the disk drive. Thus, what is needed is a disk drive designed such that it can withstand the shock test set froth in the PCMCIA standard and more particularly designed to withstand the shock of impact caused by a drop on the corner of the drive and by a flat drop onto one of the major surfaces of the drive.

Another need for disk drives is the ability to seal the juncture between the base and the cover of the drive. The environment inside the disk drive must be very clean as the transducer is typically flown within 2 to 3 microinches of the surface of the disk. At such low heights, a particle of smoke from a cigarette is a major obstacle which would cause what is known as a "head crash" and would also result in a loss of data on the surface of the disk. A loss of data is a major concern to manufacturers of disk drives as it is a major concern to customers or users of disk drives.

To prevent contamination, most manufacturers provide tight seals around the joints in the disk drive and provide a filter to remove large particles and organic contaminants from any incoming air. The tight seals prevent unfiltered incoming air from entering where the seals are located and require the incoming air to pass through the filtered opening in the disk drive. It is important to also provide a good seal that is not easily removed from an assembled disk drive. If the seal can be removed, then the possibility occurs where unfiltered air can enter the disk drive. Also, the seal should be compliant to not only provide for a good seal between the various parts of the disk drive but also to provide for some shock absorption between the base and the cover of the drive.

It would also enhance manufacturability if the shock absorption system and the seal or gasket was one unitary piece which could be laid down on the base in a top down assembly of the disk drive.

Since these small disk drives are so susceptible to shock loading or impact, either while installed in a computer or when outside of the computer, it would also be advantageous to have a way to detect when a drive has undergone a shock loading or impact event of a selected magnitude. This would be advantageous since a drive may still work after undergoing such a shock and a user could then copy the data on the disk to assure against data loss, before failure occurred. Furthermore, a user who was purchasing these small drives would know if the disk drive has undergone such an impact and could refuse the purchase. It is thought that these drives will be very inexpensive and readily available in computer stores. With a visible shock detector, a purchaser could be assured that the drive had not already undergone some sort of shock during shipment The store purchasing the drives would also be assured that the shipment was good and that there would not be an inordinate amount of returns of the drives purchased for resale. If purchased via mail order, the purchaser could also check the drive to assure that the drive had not been mishandled during shipment. If it had it could be returned and the company selling the drive could collect the cost of the drive from the shipper.

Thus, what is needed is a shock absorbing system for a disk drive that can pass the tests set forth in the PCMCIA standard and which can withstand drops on the corner of the disk drive as well as flat drops which are substantially along an entire edge or along an entire flat surface on the disk drive. What is also needed is a seal or gasket that is integral with the shock absorber and which can be placed on the base or cover easily to enhance manufacturability of the disk drive. In addition, the gasket and bumper should be locked into place so that the seal is not broken or so that the bumper does not separate from the disk drive during a shock. This mitigates the problems which could arise from taking in unfiltered air and from subsequent shocks. Also, there is a need for a way to indicate when such a disk drive has undergone shock loading or an impact of a certain level. Preferably, the indicator should be clearly visible from the exterior of the drive.

SUMMARY OF THE INVENTION

Disclosed is a combination shock absorber and gasket seal capable of passing the impact tests set forth in the PCMCIA. The shock absorber and gasket seal is also a one-piece unit which aids in the manufacturability of the disk drive. The one-piece shock absorber and gasket seal also includes a mechanism to maintain the shock absorber and gasket in place during a shock. The mechanism to maintain the position of the shock absorber and gasket has several different features at different positions about the juncture between the base of the disk drive and the cover. The gasket has cutouts therein to accommodate the disk and allow enough space to let the body yield elastically somewhat without contacting the disk. The mechanism to maintain the position of the shock absorber is different in this location. The one-piece shock absorber and gasket seal extends around more than three sides of the perimeter of the disk drive enclosure. In one preferred embodiment, the one-piece shock absorber and gasket seal extends to the full height of the disk drive. In some places there are ribs which extend beyond the height of the disk drive so as to provide shock absorbing capability in the event of a flat drop. In another preferred embodiment of the shock absorbing system, there are a plurality of rotatable blocks of shock absorbing material attached to the disk drive. The blocks are rectangular in cross section and can be rotated out to a position where their height is greater than the height of the drive. When a user removes the drive from a system, the blocks can be so rotated so that in the event of a flat drop, the drives will land on the rotatable blocks rather than on the flat cover or base of the drive. Also disclosed is a shock indicator which is visible from the exterior of the drive. When a drive has undergone a shock of a selected magnitude, the indicator will change color thereby warning the user that the disk drive has undergone a shock above a selected level.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
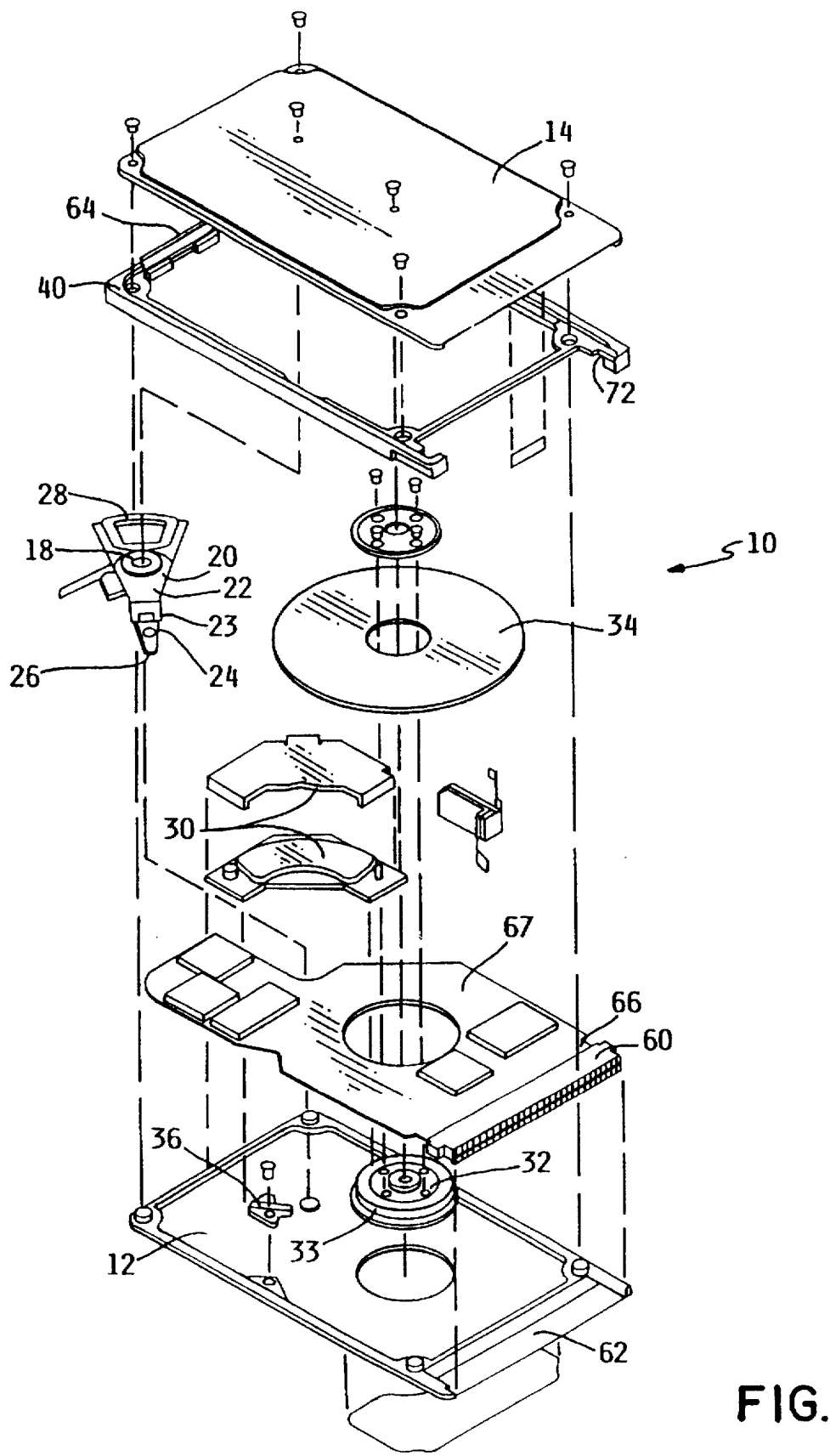
FIG. 1 is an exploded view of a disk drive.

The invention described in this application is useful with all mechanical configurations of disk drives or direct access storage devices ("DASD") having either rotary or linear actuation. FIG. 1 is an exploded view of a disk drive 10 having a rotary actuator. The disk drive 10 includes a housing or base 12, and a cover 14 for the housing or base. The housing or base 12 and cover 14 form a disk enclosure. Rotatably attached to the housing or base 12 on an actuator shaft 18 is an actuator assembly 20. The actuator assembly 20 includes a comb-like structure 22 having a plurality of arms 23. Attached to the separate arms 23 on the comb 22, are load beams or load springs 24. Attached at the end of each load spring 24 is a slider 26 which carries a magnetic transducer (not shown). The slider 26 with the transducer form what is many times called the head. It should be noted that many sliders have one transducer. It should also be noted that this invention is equally applicable to sliders having more than one transducer, such as what is referred to as an MR or magneto resistive head in which one transducer is used only for reading and another is used for writing. Many sliders 26, which employ thin film transducers, have more than one thin film transducer but generally use only one of the thin film transducers. On the end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted to the housing 12 is a spindle motor 32. The spindle motor 32 includes a rotating portion called the spindle hub 33. In FIG. 1, a single disk 34 is attached to the spindle hub 33. In other disk drives a number of disks may be attached to the hub. Also disclosed is an expanded flex cable or regular printed circuit card 67 which includes many of the electrical components for performing many of the electrical operations of the disk drive. The expanded flex cable or printed circuit card 67 is positioned inside the disk enclosure. The components on the expanded flex cable or printed circuit card 67 are treated to substantially reduce or eliminate outgassing within the disk enclosure. The invention described herein is equally applicable to disk drives have a number of disks attached to the hub of the spindle motor. Also attached to the base or housing 12 is a ramp structure 36 for loading and unloading the slider 26.

Figure 2:
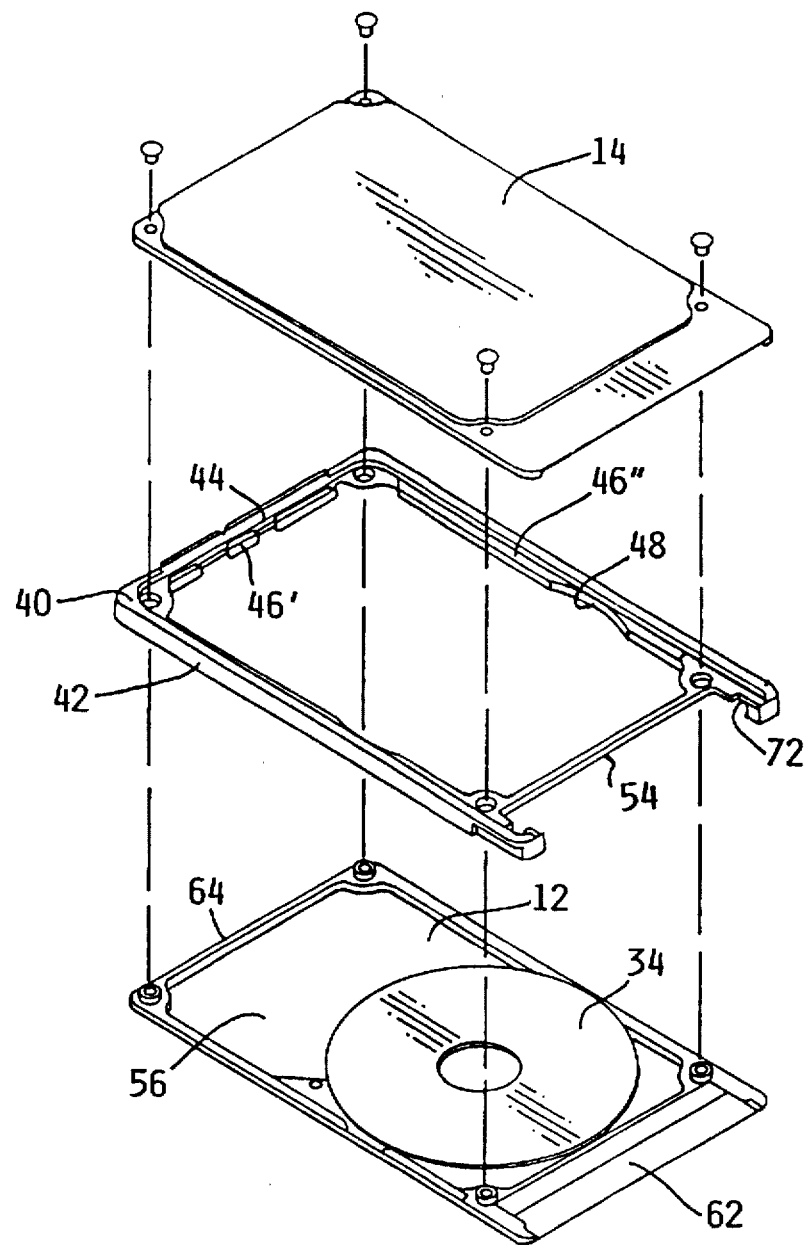
FIG. 2 is an exploded view of a disk drive which shows the integral gasket and shock absorbing bumper. Several of the components of the disk drive shown in FIG. 1 are eliminated for the sake of clarity.

FIG. 2 is an isometric view of the disk drive 10 with many of the mechanical assemblies of FIG. 1 removed for the sake of clarity. FIG. 2 adds a combination shock absorbing bumper and gasket seal 40. The combination shock absorbing bumper and gasket seal 40 includes an elastomeric bumper 42 and a gasket seal portion 44. The gasket seal portion includes locking tabs 46' and 46" which keep the combination shock absorbing bumper and gasket seal 40 in position during a shock loading event or impact, or in the event of rough handling. The locking tabs 46' and 46" occur on three sides of the disk drive 10. There are actually two types of locking tabs 46' and 46" which will be discussed with the cross-sectional views of FIGS. 3 and 5 below. The combination shock absorbing bumper and gasket seal 40 also has special locking features at or near one end of the drive which will be further detailed in the discussion of FIG. 6. The gasket seal portion 44 (shown in FIGS. 2–5) has a pair of cutouts 48 therein which provide disk 34 with enough clearance to allow the disk 34 to rotate and also to allow for a small amount of clearance during an impact. The combination shock absorbing bumper and gasket seal 40 also includes a connector portion 54 which makes the gasket seal portion 44 extend around a sealed disk enclosure 56 of the drive 10. It should be noted that the combination shock absorbing bumper and gasket seal 40 is a one-piece assembly which facilitates the manufacture of the drive 10. Since the combination shock absorbing bumper and gasket seal 40 is one piece, the combination shock absorbing bumper and gasket seal 40 merely has to be correctly positioned on top of the base 12 during a top down manufacturing procedure where the base 12 is laid down and components are attached to it. After placing the combination shock absorbing bumper and gasket seal 40 on the edge of the base 12, the components are attached to the base 12 and the last step of attaching the cover 14 to the base seals the disk drive to form the sealed disk enclosure 56 and lock the combination shock absorbing bumper and gasket seal 40 in place.

Figure 6:
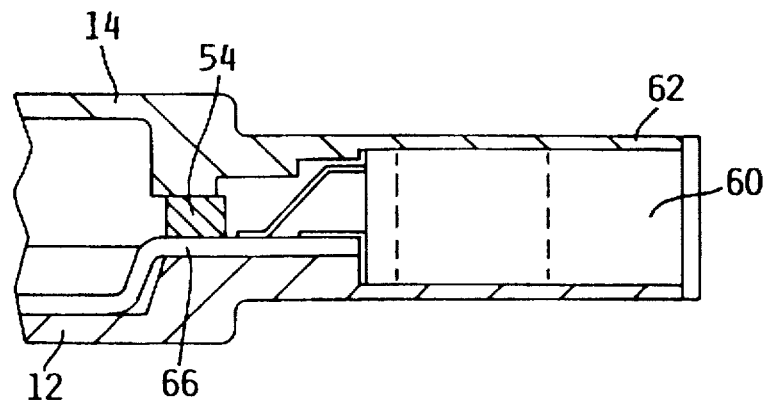
FIG. 6 is a cross-sectional view of the shock absorbing bumper in an assembled drive in the area near the end of the disk having the connector.
Figure 7:
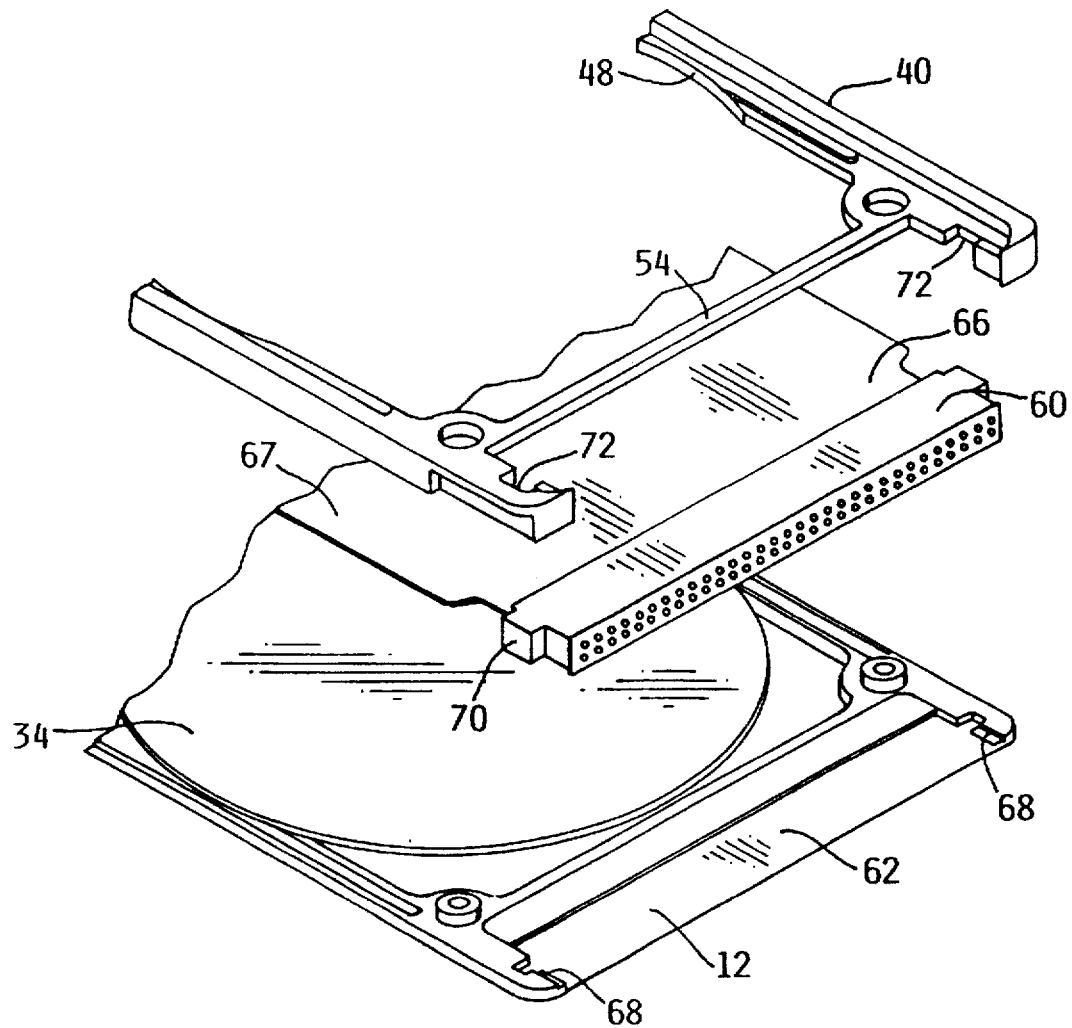
FIG. 7 is an isometric cut-away view of the end of the disk drive with the connector which shows the locking features on the drive and corresponding features on the one-piece shock absorber and gasket seal.
Figure 8:
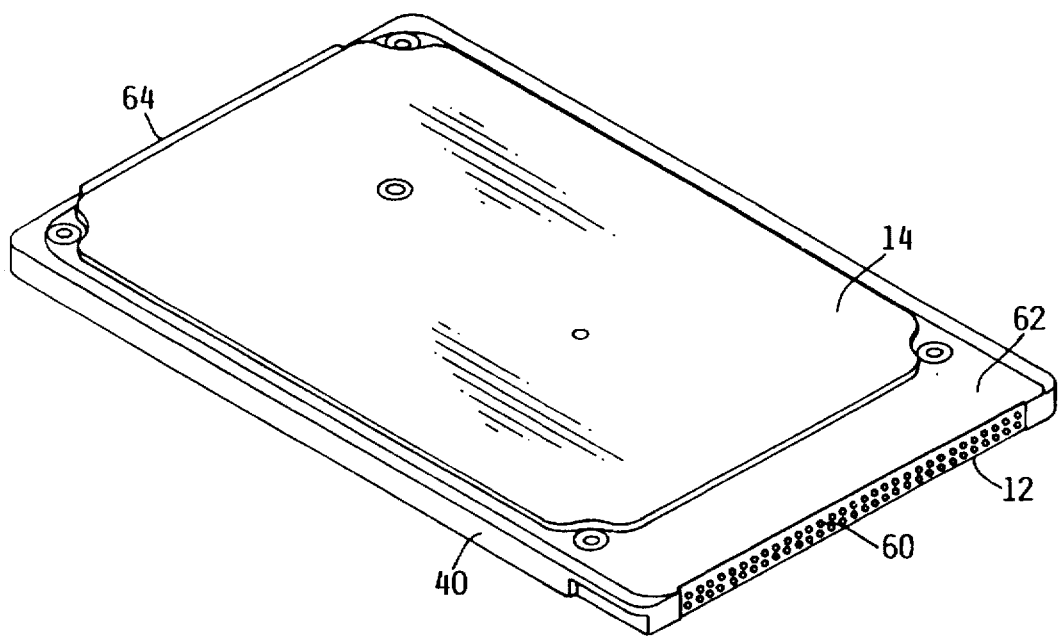
FIG. 8 is an isometric view of the assembled disk drive which uses the combination shock absorber and gasket seal.

Now turning briefly to FIGS. 6–8, it can be seen that the disk drive 10 includes a connector 60 located at one end of the disk drive 10. Returning to FIGS. 1 and 2, the disk drive has two shorter sides which are a connector end 62 and short side 64. The disk drive 10 also has two longer sides which are substantially identical and not thought to need specific element numbers.

Figure 3:
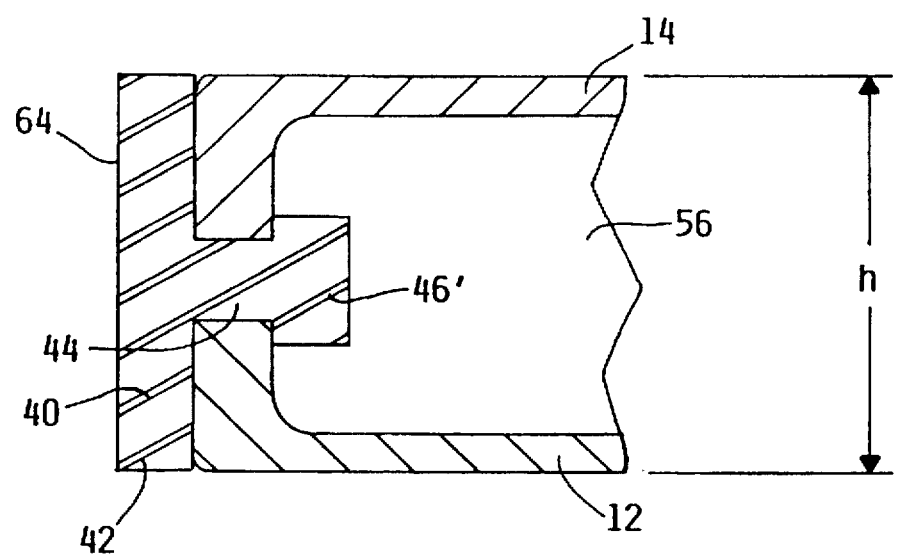
FIG. 3 is a cross-sectional view of the shock absorbing bumper in an assembled drive.

FIG. 3 shows a cross sectional view of the short side 64 of the drive 10. In FIG. 3 the combination shock absorbing bumper and gasket seal 40 is shown in its assembled position between the base 12 and the cover 14. When assembled the cover 14, base 12 and combination bumper and gasket 40 form a sealed disk enclosure 56. The elastomeric bumper portion 42 of the combination bumper and gasket seal 40 extends to the full height, h, of the disk drive 10. The full height, h, of the disk drive 10 includes the thickness of the cover 14, the thickness of the base 12 and the thickness of the gasket seal portion 44 which is sandwiched between the base 12 and the cover 14. The combination bumper and gasket seal 40 also includes locking tab 46' which is located on the end of the gasket seal portion 44 extending into the sealed disk enclosure 56. The locking tab 46' is thicker than the thinnest portion of the gasket seal portion 44. The locking tab 46' thus has surfaces which contact the base 12 and the cover 14 and prevent the combination shock absorbing bumper and gasket seal 40 from being pulled out or removed during an impact or handling.

Figure 4:
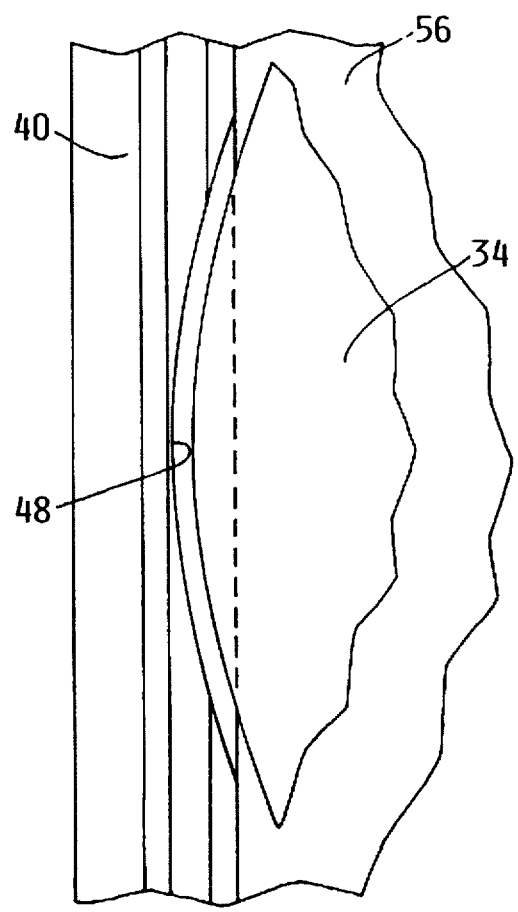
FIG. 4 is a top cut away view of the integral shock absorbing bumper and gasket near the disk of the disk drive.

FIG. 4 is a top cut away view of the combination bumper and gasket seal 40 along one of the longer sides of the drive and near the disk 34. The combination bumper and gasket seal 40 includes cutouts in the gasket seal portion 44. The cutout 48 are along a radius which is slightly larger that the radius of the disk 34. The disk drive is designed such that the cutout provides an adequate amount of room during an impact so that the portion near the cutout 48 of the combination bumper and gasket seal 40 will not contact the edge of the disk 34 during an impact. It should be noted that an elastomeric bumper must be designed with the specified impact load the disk drive is to undergo in mind. The material must be selected so that it is not so soft that various parts of the disk drive contact during an impact. In addition, the material must be selected so that it is not so hard that no shock absorbing takes place.

Figure 5:
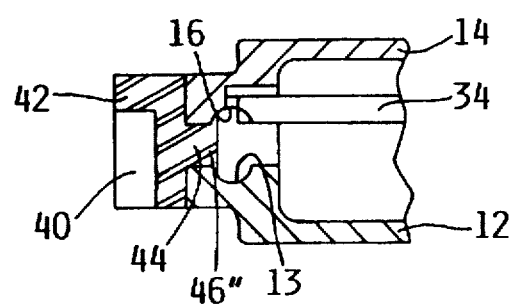
FIG. 5 is a cross-sectional view of the shock absorbing bumper in an assembled drive in the area near the disk of the disk drive.

Now turning to FIG. 5, a cross sectional view of the combination bumper and gasket seal 40 in the area near the disk is shown. The cross sectional view in FIG. 5 is representative of the combination bumper and gasket seal 40 along the longer sides of the disk drive 10. As shown in FIG. 5, the base 12 includes a semicircular relief 13 near the edge of the base 12. Similarly the cover 14 also includes a semicircular relief 16 which is also near the edge of the cover 14. The gasket seal portion 44 of the combination bumper and gasket seal 40 is sandwiched between the cover 14 and the base 12 in the assembled position shown in FIG. 5. When assembled, the base 12 combination bumper and gasket seal 40, and the cover 14 form a seal which enables the disk drive 10 to make a sealed disk enclosure 56. As shown in FIG. 5, the gasket seal portion 44 is sandwiched between the cover 14 and base 12. The locking tab 46" extends into and contacts the semicircular relief 13 in the base and the semicircular relief 16 in the cover so that the combination bumper and gasket seal 40 is locked into position and will not come out in the event of an impact. It should also be noted that the bumper portion 42 extends to the height of the cover 14 and the base 12 along the long sides of disk drive 10. On the long sides, the bumper portion 42 is less than the total height, h, of the disk drive 10.

FIG. 6 is another cross sectional view of the disk drive across the connector end 62 of the drive 10. Shown in FIG. 6 is the cover 14, the base 12, the connector 60 and the connector portion 54 of the gasket seal 44 of the combination bumper and gasket seal 40. Also shown is another electrical connector 66 which is near the connector 60. The electrical connector 66 connects the connector 60 and the expanded flex cable or regular printed circuit card 67. The electrical connector 66 can be a flex cable. It is also contemplated that the electrical connector 66 and the expanded flex cable or regular printed circuit card 67 can be one continuous flex cable. The electrical connector 60 includes several pins which attach to the connector 66 and then to the expanded flex cable or regular printed circuit card 67. Although shown in FIG. 1 on the inside of the disk enclosure, the expanded flex cable or regular printed circuit card 67 could also be positioned either inside or outside the disk enclosure. Turning briefly to FIG. 1, the expanded flex cable or regular printed circuit card 67 shown in this preferred embodiment is positioned inside the disk enclosure. The expanded flex cable or printed circuit card is glued or bonded to the base on the inside of the disk enclosure. Components populating the flex cable or printed circuit card which are too large to incorporate within the flex cable or printed circuit card, and which are prone to outgassing, are sealed to lessen outgassing. It should also be noted that the flex cable or printed circuit card 67 has a footprint which is substantially equal to the footprint of the sealed disk enclosure portion associated with the base 12. When assembled the flex cable or printed circuit card 67 fits on the floor of the base 12 beneath the disk 34. Returning to FIG. 6, the connector portion 54 of the gasket seal is sandwiched between the cover 14 on one side of the connector portion 54 and the connector 66 and base 12 on the other side of the connector portion 54 of the gasket seal 44. When fully assembled this forms the sealed disk enclosure 56 of the disk drive 10.

FIG. 7 is an isometric cut away view of the end of the disk drive 10 which houses the connector 60. As shown in FIG. 7 the base 12 includes locking features 68 which mate with tabs 70 on the connector 60. When assembled the tabs of the connector 60 fit within the locking features on the base 12 to provide strain relief for or between the connector 60 and the pins attached to the flex cable 66. Thus when the disk drive 10 is inserted or removed from the slot which takes the disk drive (not shown) the forces will not be transmitted to the flex cable 66 but rather to the base 12. The combination gasket seal and bumper 40 also includes locking features 72 which correspond with the locking features on the base 12 and which also mate with the tabs 70 of the connector 60. These locking features prevent the combination bumper and gasket seal 40 from being removed from the connector end 62 of the disk drive 10 due to an impact or due to regular or rough handling. The locking features also help to seal the disk drive near the connector 60.

FIG. 8 shows an isometric view of a first embodiment of the disk drive as shown in FIGS. 1 through 7 above. The disk drive shown in FIG. 8 is in its assembled state rather than the exploded view shown in FIG. 1. This disk drive is a PCMCIA Type II device that has a height of 5.0 mm. The length and width of the PCMCIA Type II disk drive is equivalent to a common plastic credit card. The PCMCIA Type II has certain height limitations along all sides of the disk drive so that the drive will fit into a corresponding PCMCIA Type II drive. The height of the drive along its length is less than the full height, 5.0 mm, of the PCMCIA Type II disk drive. Since the height along the length of the disk drive is less than the full height, 5.0 mm, of the disk drive, this embodiment is somewhat prone to damage due to a flat drop, which is a drop such that a substantial portion of the base 12 or cover 14 will contact the surface when dropped.

Figure 9:
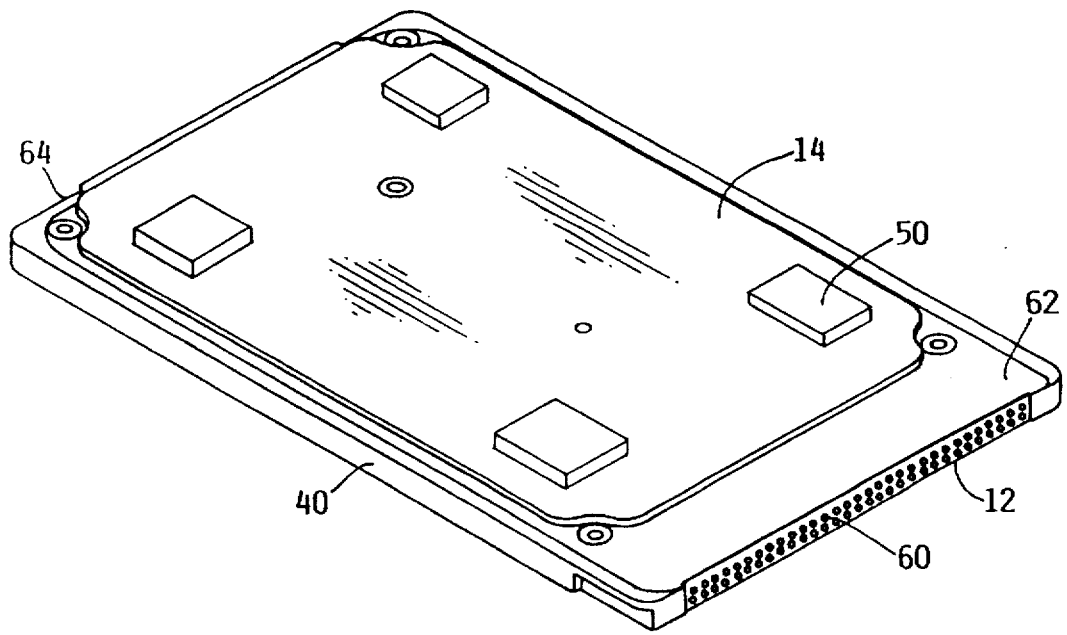
FIG. 9 is an isometric view of a drive having elastomeric pads that extend above the height of the disk drive.

FIG. 9 shows a view of a disk drive 10 having the combination bumper and gasket seal 40. Shown on the surface associated with the cover 14 are elastomeric pads 50 which extend the height of the disk drive 10 to a height greater than the height, h, of the disk drive as shown in FIGS. 1 through 8. The elastomeric pads 50 are located on cover 14 and base 12 (not shown). Elastomeric pads 50 will prevent damage due to flat drops where the disk drive would land on the surface defined by either the majority of the base 12 or the majority of the cover 14. The disk drive 10 which includes additional pads 50 extending above the height, h, of the disk drive would be useful where a PCMCIA Type II drive would fit into a slot in a computer with a disk drive slot larger in height than 5.0 mm. One such application would be for fitting a PCMCIA Type II disk drive into a slot for a PCMCIA Type III disk drive which would have a height of 10.5 mm.

Figure 16:
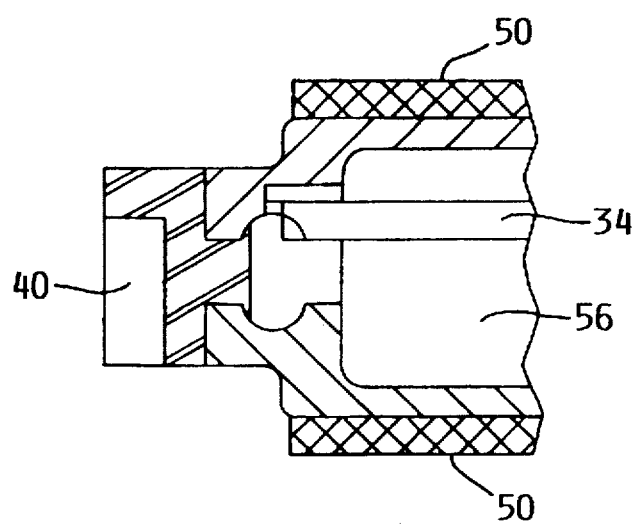
FIG. 16 is a cut-away side view of an edge of using an elastomeric pad.

FIG. 16 shows a cross-sectional view of the disk drive 10 with pads 50 along one of the edges of the drives. The pads 50 in FIG. 16 are shown closer to the edge of the drive than the pads of FIG. 9. The pads 50 can be placed as close to an edge as possible. The limiting factor for pads 50 placement will be to allow the drive to slide in and out of the slot (not shown). It is also necessary to use at least three pads 50 so as to define a plane on one of the base or cover. A single solid pad covering a major portion of the cover 14 or base 12 could also be used just as effectively.

Figure 10:
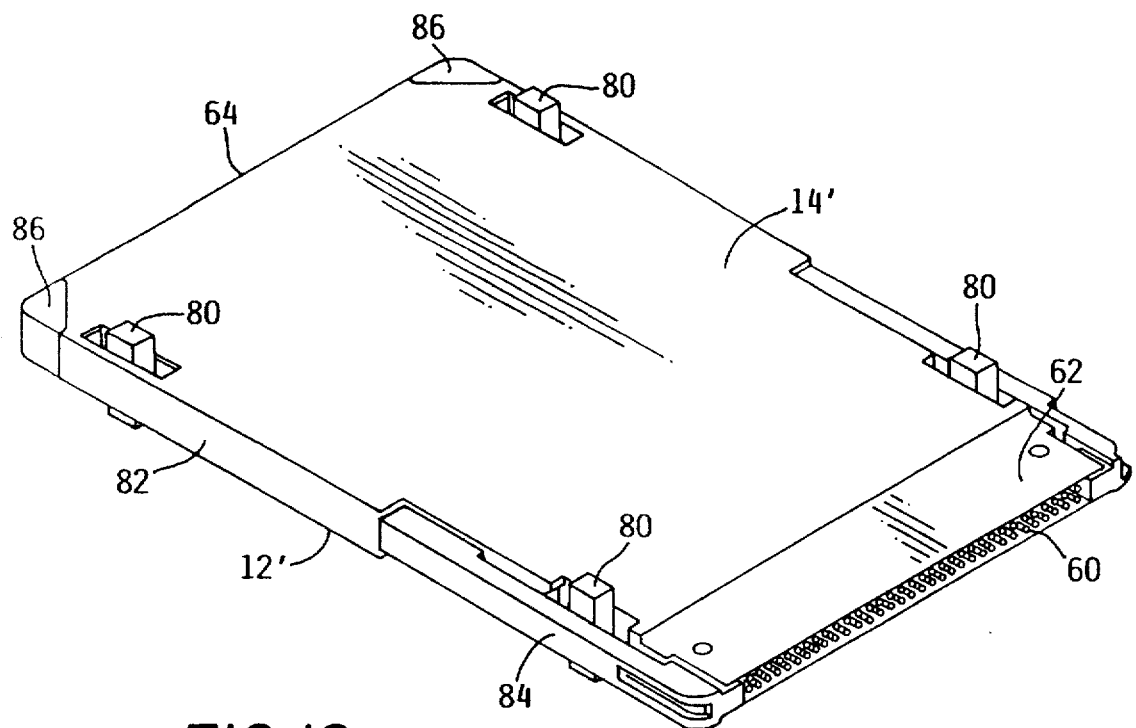
FIG. 10 is an isometric view of a second preferred embodiment of the shock absorbing system for a disk drive.

Now turning to FIG. 10, a second preferred embodiment of a shock absorbing system for a disk drive 10 is shown. Of course the disk drive 10 will include many of the same internal components as the disk drive shown in FIGS. 1 and 2. As a result, the description of the second preferred embodiment will not include a description of all the internal portions of the disk drive for the sake of brevity of this description. The disk drive shown in FIG. 10 has a connector 60 located on one end of the disk drive. The disk drive thus has a connector end 62 and a short side 64 of the drive 10. The disk drive of this second embodiment of the disk drive 10 includes four pivotally mounted elastomeric bumpers 80. The elastomeric bumpers 80 are attached to a frame 82 of the disk drive. Openings in the frame 82 allow the elastomeric bumpers 80 to be mounted pivotally and also allow the elastomeric bumpers to be pivoted to a position where the elastomeric bumpers are at the same height as the height, h, of the disk drive. Along the short side 64 of the disk drive of the second embodiment and more particularly at the corners of the short side 64 of the drive are two elastomeric end caps 86 near the connector end 62. Attached or bonded in one of many known ways to the frame 82, is a connector shroud 84. The connector shroud and frame are further detailed in FIG. 11 below. Advantageously the rotatable elastomeric bumpers 80 can be rotated into a position where their height is greater than the height, h, of the disk drive. This prevents damage to the drive in the event of a flat drop where a substantial portion of the base 12' or a substantial portion of the surface associated with the cover 14' would contact the surface onto which it was dropped.

Figure 11:
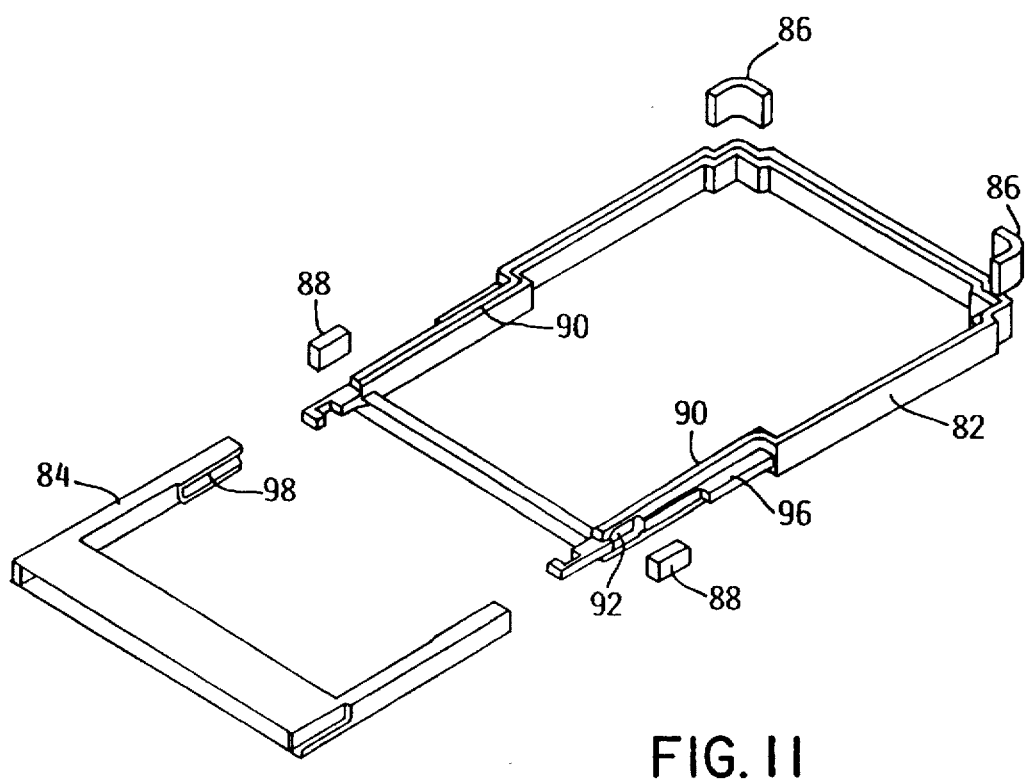
FIG. 11 is an isometric view of a second preferred embodiment of the frame and connector shroud of the second preferred embodiment of the shock absorbing system for a disk drive.

Now turning to FIG. 11, the frame 82 and the connector shroud 84 will be further detailed. The frame 82 includes recesses at the corners associated with the short side 64 of the frame or disk drive 10. These recesses are for receiving the elastomeric end caps 86. There are elongated recesses on each side of the frame 82 which intersect with the connector end 62 of the disk drive 10. The elongated recesses 90 include an additional small recess 92 for receiving an additional elastomeric bumper 88. It should be noted that these elastomeric bumpers 88 are in addition to the pivotable elastomeric bumpers 80. The elastomeric bumpers 88 fit within the small recesses 92 in the elongated recesses 90 of the frame. The connector shroud 84 then fits over the small elastomeric bumpers 88 in the recesses and engages the elongated recess 90 which has a rib 96 which fits into a channel 98 in the connector shroud 84. The shroud is bonded to the frame.

Figure 12:
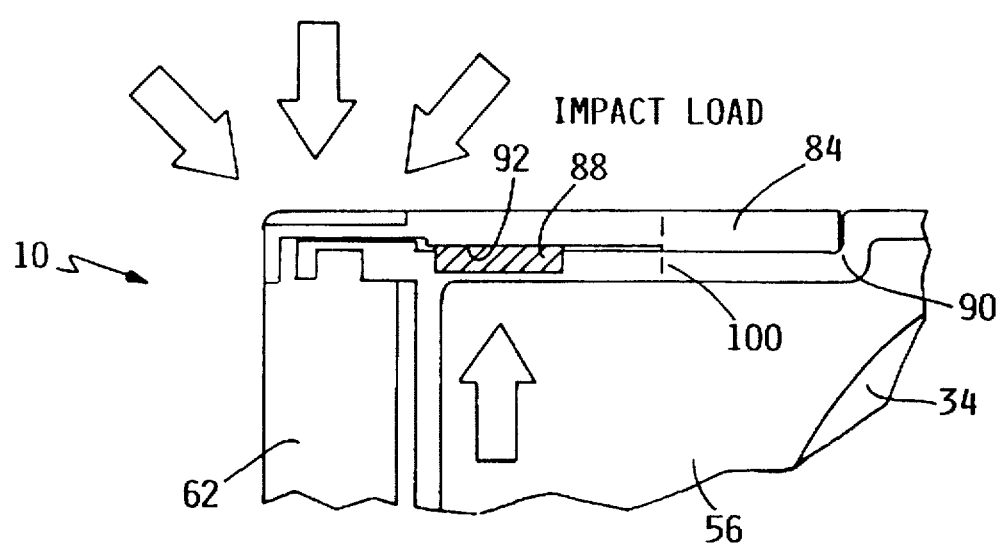
FIG. 12 is a top view of the corner of a disk drive shown in FIGS. 10 and 11 which shows how the corner withstands an impact load to the corner.
Figure 13A:
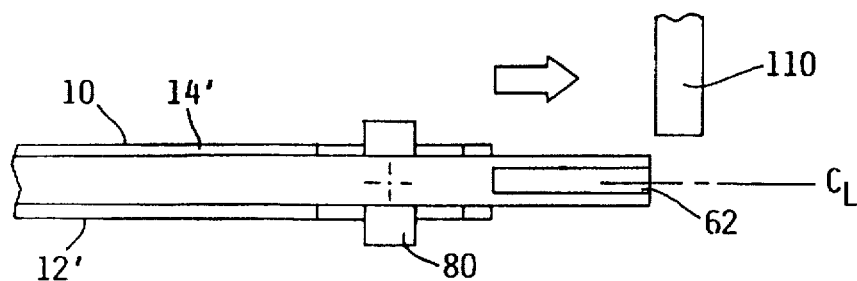
FIGS. 13A, 13B, 13C and 13D are side views of a second embodiment of the drive at sequential times during the insertion of the drive into a drive bay.
Figure 13B:
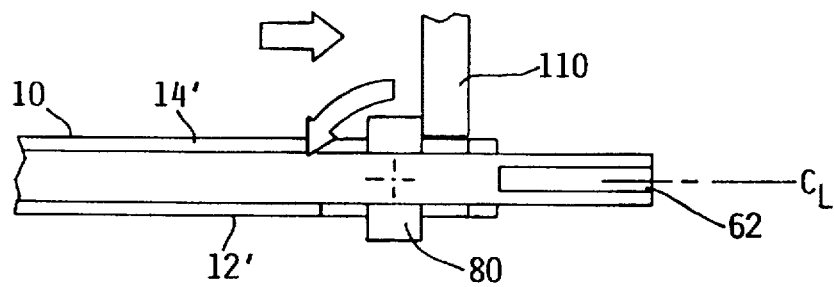
Figure 13C:
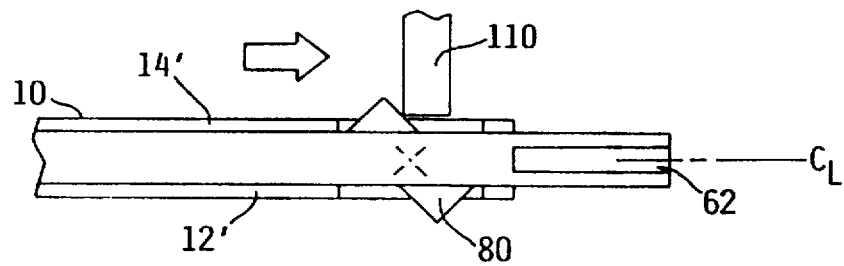
Figure 13D:
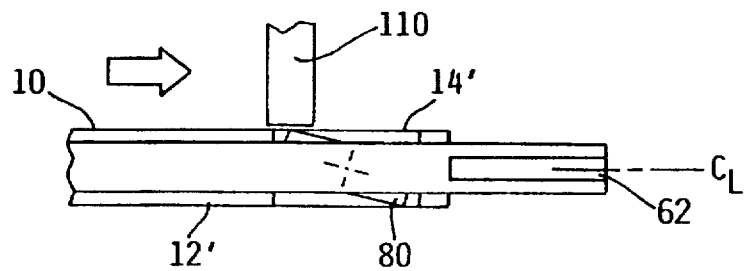

Now turning to FIG. 12, which is a top view of a corner of the drive near the connector end 62 of the drive 10 as it is being loaded due to an impact, the operation of the shock absorbing elastomeric bumper 88 in the small recess 92 of the frame 82 will now be discussed. In the event of an impact load on the corner, the connector shroud 84 pivots about point 100. As it pivots the connector shroud compresses the small shroud bumpers 88 near the corner where the impact is occurring. The pivot point 100 occurs at the point where the rib 96 and the frame for receiving the shroud ends within the channel 98 of the connector shroud 84. Thus it can be seen that when an impact occurs on a corner the connector shroud 84 transfers the impact load to the shroud bumper 88 and disperses the impact load across the shroud bumper. After the impact load has passed the shroud bumper 88 returns to its original position and pushes the connector shroud back to its static position.

FIG. 13 shows a side view of the second embodiment of the disk drive 10 at sequential times during insertion of the drive into a disk drive bay. In FIG. 13a the disk drive is going into the bay however, with the elastomeric bumpers 80 in their extended positions. The center line $\mathcal{C}$ shown is understood to be the center line of the disk drive bay (not shown). In FIG. 13b the wall of the drive bay contacts the pivotable elastomeric bumper 80 which is shown. In FIG. 13c the disk drive is further inserted into the drive bay (not shown) and the wall 110 pivots the elastomeric bumper 80 further out of the extended position. FIG. 13d shows the disk drive 10 further inserted into the drive bay with the wall 110 almost past the elastomeric bumper 80. In FIG. 13d the elastomeric bumper 80 has been pivoted to the position where the height of the elastomeric bumper is equal to or less than the height of the disk drive 10. Of course when the second elastomeric bumper 80 on the same side contacts the wall 110 the same sequence will reoccur as the drive is fully inserted into the disk drive bay (not shown).

It should be noted that with respect to FIG. 11 the base 12' and the cover 14' are bonded to the frame to form a sealed disk enclosure.

Further it should be noted that the rotatable or pivotable elastomeric bumpers 80 of the second preferred embodiment could also be included in the first embodiment of disk drive 10 shown and described in FIGS. 1 through 9.

Figure 14:
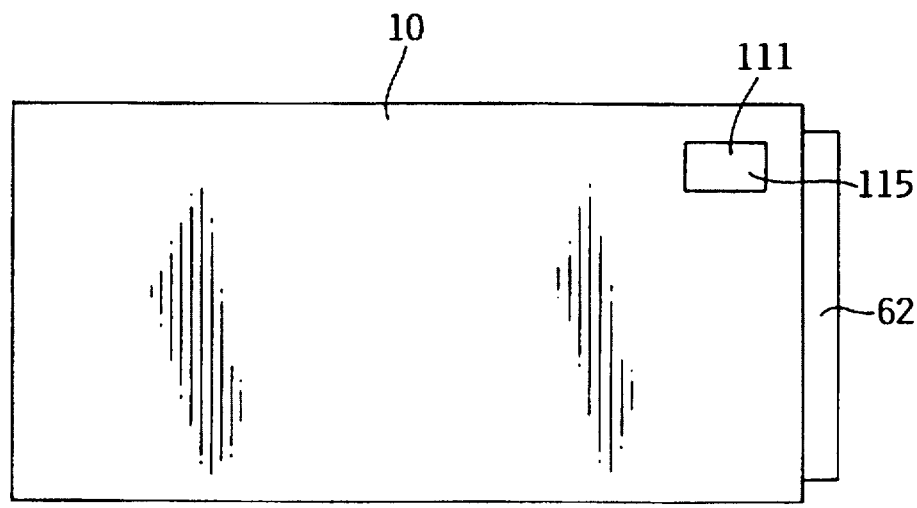
FIG. 14 is a top view of the cover of a disk drive which includes a covered window where a shock sensor can be viewed.
Figure 15:
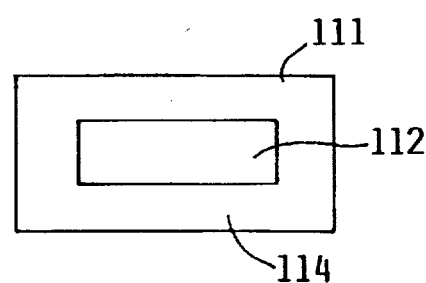
FIG. 15 is a view detailing the shock sensor shown in FIG. 14.

Now turning to FIGS. 14 and 15, a shock watch sensor 111 will be described. The shock watch sensor 111 is included in the disk drive 10. Preferably, the shock watch sensor 111 is housed within the disk drive 10 and has a transparent cover 115 which is in either the cover 14 or the base 12 of the disk drive. The shock watch sensor 111 is mounted on the base 12 and undergoes a color change after a disk drive is subjected to shock loading in excess of a prespecified level. The shock watch sensor 111 further includes a capsule 112 filled with a colored liquid. Surrounding the capsule 112, is a porous material 114. The capsule 112 and porous material 114 is also in a container which in turn is attached to the base 12 of the disk drive 10.

In operation, the capsule 112 will break when the disk drive 10 undergoes a shock load which is in excess of a prespecified level. The fluid in the capsule 112 spills into the porous material 114. By capillary action, the colored fluid spreads throughout the porous material 114 so that it is visible through the transparent cover portion of the disk drive 10. Once broken, a person can quickly determine if the disk drive 10 has undergone a shock over a preselected level. The shock watch 111 is particularly useful for consumers. It is thought that PCMCIA Type II and PCMCIA Type III drives will be widely available to consumers through a variety of distribution points. When consumers go to a store to pick up a disk drive, the consumer can check a drive to make sure it has not undergone a shock of a preselected level. Thus, consumers confidence in the quality of the disk drive will be improved since the consumer will know that the disk drive has not been damaged due to a shock before purchasing the drive. Store owners will also know when a box of disk drives has been dropped or mishandled during shipment and can settle the matter with the shipper or manufacturer. In addition, the manufacturer would know when a disk drive had undergone a shock of a selected level if the disk drive had been returned under warranty or after a field failure. It should be noted that the shock watch 111 can be designed to trigger at any specified shock load level.

The present invention and the best modes for practicing it have been described. It is to be understood that the foregoing descriptions are illustrative only and that other means and techniques can be employed without departing from the full scope of the invention as described in the appended claims.

What we claim is:

1. A disk drive comprising:

a base;

at least one disk rotatably attached to said base;

an actuator rotatably attached to said base, said actuator further including a transducer located proximate one end of the actuator, said actuator positioning the transducer over said at least one disk in transducing relationship with the disk;

a cover attached to said base to form an enclosure for said at least one disk and said transducer, said enclosure having four sides with a given height;

a connector associated with one of the four sides, said connector having a height no greater than the given height;

a shock prevention system including at least one bumper block rotatably attached to the enclosure, said bumper block rotatable to at least two positions, which include a first position where the bumper block does not extend beyond the given height of the enclosure, and a second position where the bumper block extends beyond the given height of the enclosure.

2. The disk drive of claim 1 wherein said at least one bumper block includes at least three bumper blocks each of which is rotatable to at least two positions.

3. The disk drive of claim 1 wherein said at last one bumper block includes at least four bumper blocks located near each corner of the disk drive, each said bumper block rotatable to at least two positions.

* * * * *